United States Patent [19]
Egbert

[11] 3,976,926
[45] Aug. 24, 1976

[54] DIGITAL DC MOTOR SPEED CONTROL CIRCUIT

[75] Inventor: William E. Egbert, Sunnyvale, Calif.

[73] Assignee: Hewlett-Packard Company, Palo Alto, Calif.

[22] Filed: Aug. 5, 1974

[21] Appl. No.: 494,670

[52] U.S. Cl. .............................. 318/331; 318/341; 318/345
[51] Int. Cl.² ........................................ H02P 7/06
[58] Field of Search .................... 318/331, 341, 345

[56] References Cited
UNITED STATES PATENTS

| | | |
|---|---|---|
| 3,588,654 | 6/1971 | Balazs .............................. 318/331 |
| 3,683,253 | 8/1972 | Rummel et al. ..................... 318/331 |
| 3,708,737 | 1/1973 | Johnson ........................... 318/331 X |
| 3,803,470 | 4/1974 | Vosteen .............................. 318/331 |

*Primary Examiner*—Gene Z. Rubinson
*Attorney, Agent, or Firm*—F. D. LaRiviere

[57] ABSTRACT

The pulse-width modulated motor speed control circuit described herein includes a binary latch-controlled motor driver, wherein the state of the controlling match is determined by the phase of the drive signal and the level of back emf of the motor when the motor is not being driven.

13 Claims, 4 Drawing Figures

DIGITAL DC MOTOR SPEED CONTROL CIRCUIT

BACKGROUND OF THE INVENTION

Digital D.C. motor speed control circuits are more efficient and therefore desirable for battery powered applications. Such circuits are usually frequency modulated or pulse-width modulated or a combination of both modulations.

Modulation is generally some function of the motor speed, which must be detected at the motor itself. A tachometer which senses the speed of the motor shaft as it rotates is often used. Another approach utilizes the fact that, when a motor is coasting (i.e. not driven) it operates as a generator which generates a back emf proportional to speed. Thus, the driving voltage can be applied to the motor when the back emf thereof crosses the triggering threshold of a back emf detector.

In prior art control circuits, however, at least one relatively large capacitor was or a plurality of smaller capacitors were required to assure stability of the feedback circuit or to average the output of a tachometer or both. The need for one or more capacitors has precluded complete adaptation of such circuits to integrated circuit technology. Moreover, if the capacitor fails, the resultant oscillation in such prior art circuits may damage the motor and other components of the circuit.

SUMMARY OF THE INVENTION

The circuit of the present invention eliminates the need for any stabilizing or averaging capacitors, while at the same time assuring servo stability by disabling the feedback circuit while the motor is driven and monitoring the back emf while the motor is not being driven. The circuit comprises a motor driver coupled to a drive signal source and back emf detector via a binary latch. The state of the latch controls the motor driver and is controlled by the phase of the motor drive signal and by the level of back emf produced by the coasting motor. Bidirectional motors can be controlled by adding another back emf sensor and providing a bidirectional motor driver.

The motor is pulsed at a fixed rate. When not driven, the back emf of the motor is detected and compared with a reference voltage. When the back emf is less than the reference voltage, the drive signal is applied to the motor via the latch. The motor driver is thus controlled by the pulse width modulated drive signal.

DESCRIPTION OF THE PREFERRED EMBODIMENT

Figure 1:
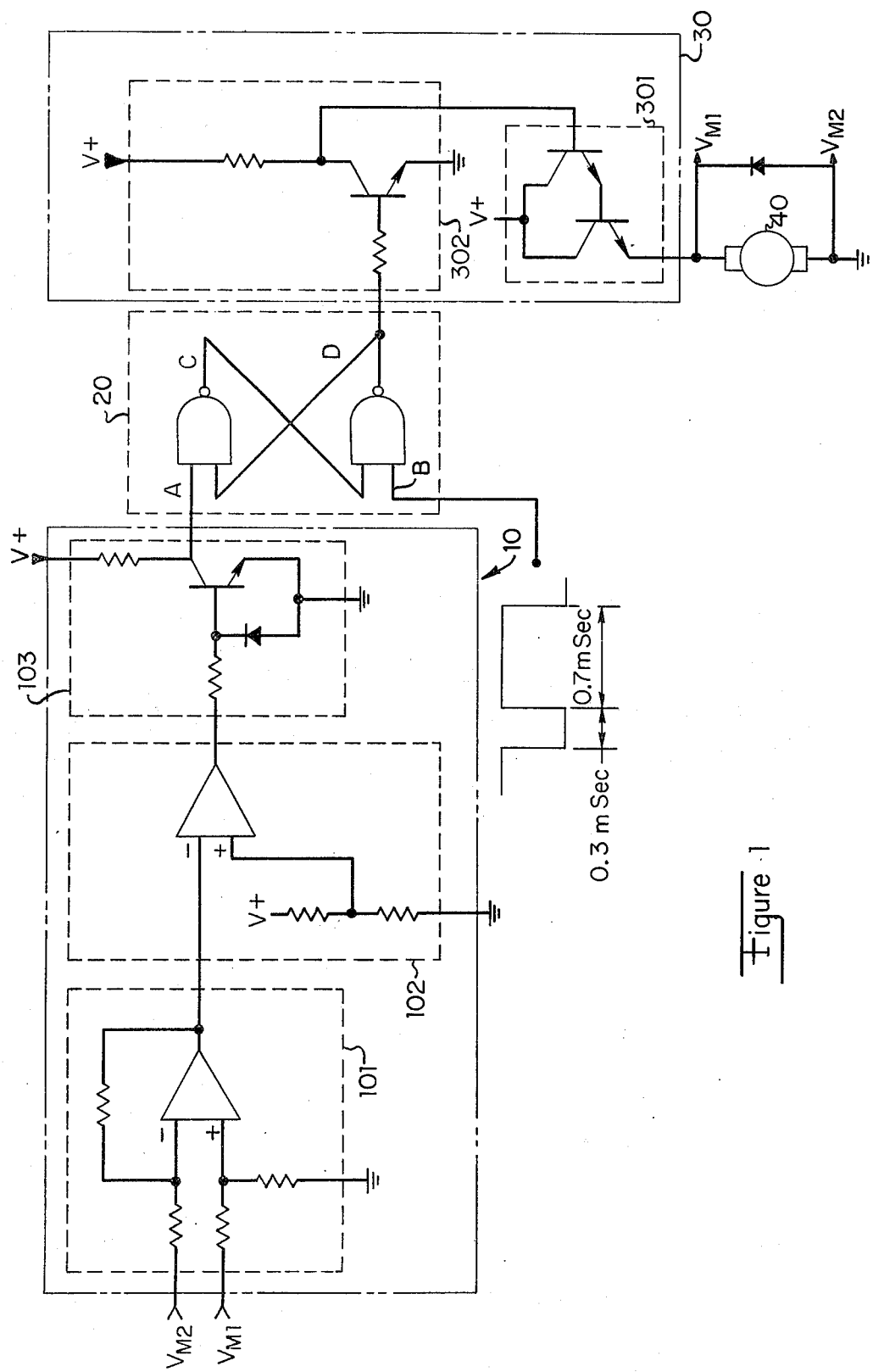
FIG. 1 is a circuit diagram of a digital motor speed control circuit for a unidirectional motor according to the preferred embodiment of the present invention.

Referring to FIG. 1, the preferred embodiment of the present invention comprises detector 10 connected to motor 40 at terminals VM1 and VM2 and coupled to binary latch 20. Binary latch 20 is coupled to motor driver 30, which drives motor 40.

Motor 40 may be any electric motor having known back emf characteristics for desired speeds and expected temperatures and loads. Motor driver 30 includes a cascaded emitter follower output 301 driven by transistor switch 302. Motor driver 30 may be any driver that is responsive to digital signal input. Detector 10 comprises sensor 101, comparator 102 and output switch 103. Binary latch 20 has the terminal characteristics of the cross-coupled NAND gates.

In operation, where motor 40 is being driven by motor driver 30, sensor 101 is saturated, and therefore disabled, and terminal D of latch 20 is at relatively low voltage (positive or negative polarity or substantially ground) potential (a zero). When terminal D is at relatively high voltage (positive polarity) potential (a one), motor 40 is coasting. A zero remains at terminal D of latch 20 so long as ones are applied at terminals B and C. If a zero is applied to terminal B, terminals A and D remain at one so long as motor speed remains high. Zeroes (negative polarity or substantially ground potential drive signal pulses) have no effect on the state of latch 20. Moreover, ones (positive polarity drive signal pulses) applied at terminal B have no effect on the state of latch 20 until a zero is applied to terminal A. The signal applied to terminal A depends on the state of comparator 102 which is determined by the coasting speed of motor 40.

While motor 40 is coasting, it acts as a generator which generators a back emf proportional to its speed, which is sensed by sensor 101. As the coasting speed of motor 40 decreases, its decreasing back emf is compared to a variable reference voltage by comparator 102, wherein the reference voltage establishes a threshold value of back emf at which comparator 102 switches to a one. The reference voltage is adjustable to compensate for differences in coasting speed versus back emf characteristics encountered from one motor to another. A one at the output of comparator 102 saturates output switch 103 and a zero appears at terminal A of latch 20. Thus, when the motor emf falls below the switching threshold of comparator 102, a zero appears at terminal A, a one appears at terminal C and a zero will appear at terminal D (the condition necessary to drive the motor) of latch 20 when a one appears at terminal B, i.e. the next positive drive signal pulse.

While this circuit has been described in terms of positive logic signal convention, it should be recognized that the principles of the invention can be embodied in negative logic signal convention as well.

Figure 2:
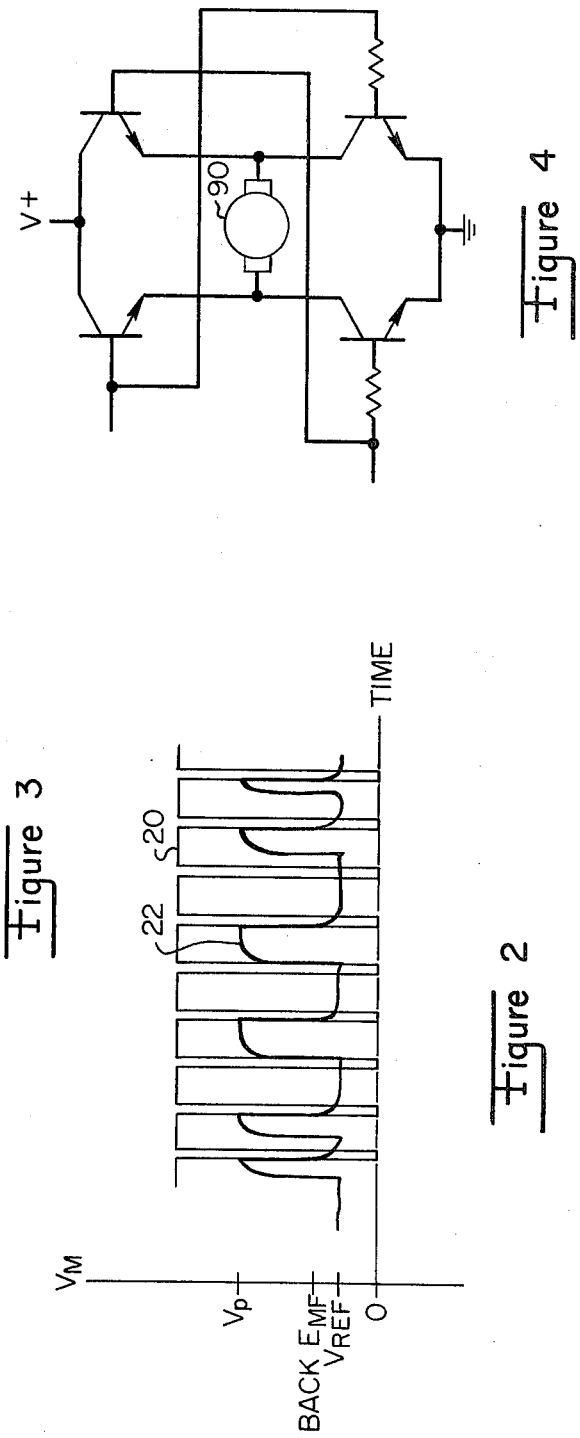
FIG. 2 illustrates the relationship between the drive signal applied to the motor and the back emf signal produced by the motor while coasting.

The drive signal at terminal B is a train of pulses as shown in FIG. 2 (waveform 20). $T_{off}$ should be long enough for switching transients to settle and to sense motor back emf. While the values will vary with individual motors, an 85% duty cycle, $T_{on}$ to $T_{off}$, is nominal for the preferred embodiment of this invention. FIG. 2 also indicates a typical back emf signal (waveform 22) relative to that drive signal. The difference between $V_{ref}$ and back emf has been exaggerated for illustration only; the difference is actually very small since motor speed is relatively constant during any one cycle.

Figure 3:
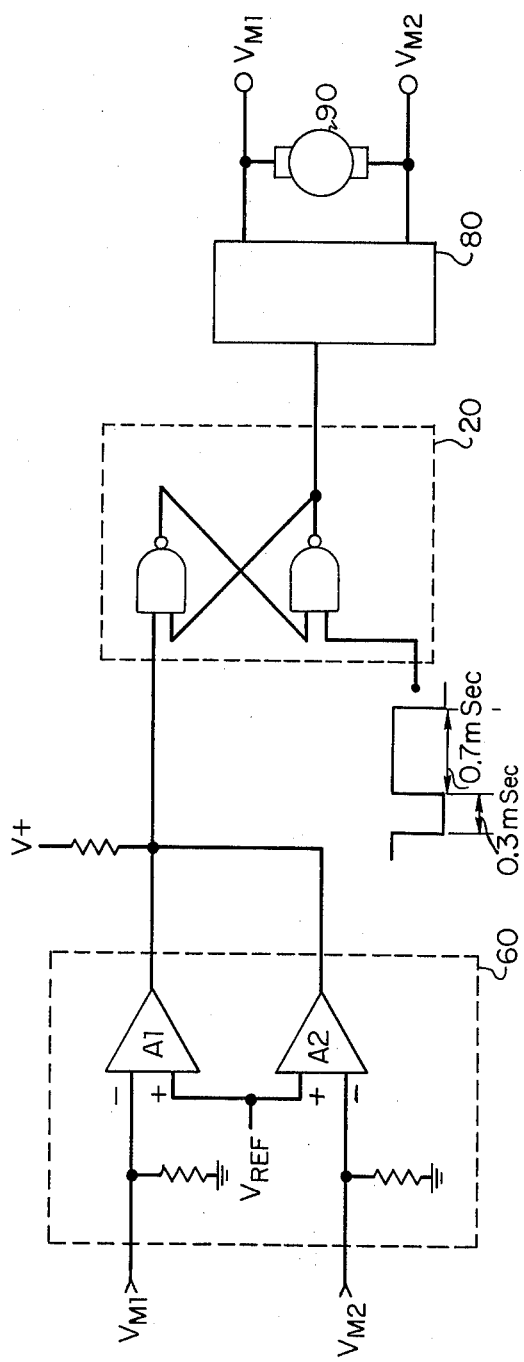
FIG. 3 is a circuit diagram of the digital motor speed control circuit of FIG. 1 for a bidirectional motor.

The circuit has been described for use with any unidirectional DC motor. However, it can be modified for use with motors employed in bidirectional applications. Referring to FIG. 3, bidirectional motor drive 80 is connected to binary latch 20 and to bidirectional motor 90. Binary latch 20 is connected to sensor 60.

Figure 4:
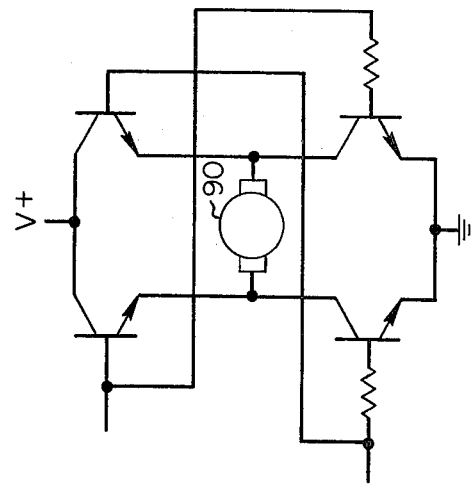
FIG. 4 is a circuit diagram of a bidirectional motor drive for the motor speed control circuit of FIG. 3.

Amplifiers A1 and A2 are open-collector output operational amplifiers which provides an output substantially like an OR gate as motor back emf in one or the other direction falls below the reference threshold. Bidirectional motor drive 80 can be a familiar transistor bridge circuit such as that shown in FIG. 4.

I claim:

1. An electrical motor speed control circuit comprising:

an electrical motor having a characteristic back emf when coasting;

a comparator having a first input port coupled to the motor for continuously monitoring the armature voltage thereof and a second input port coupled to a reference voltage, said comparator producing a first output signal when the armature voltage is the characteristic back emf of the motor having a value less than the reference voltage and a second output signal when the armature voltage is greater than the reference voltage;

switching means having an on-state and an off-state, a first input port for receiving a drive signal, said drive signal having first and second phases, and a second input port coupled to the comparator for receiving the first and second output signals therefrom, to produce an on-state of the switching means in response to the combination of the first phase of the drive signal and the first output signal, and to produce the off-state of the switching means in response to the second phase of the drive signal or the second output signal; and a motor driver coupled to the switching means and the motor for applying electrical power thereto when the switching means is in the on-state and for removing electrical power therefrom when the switching means is in the off-state.

2. An electrical motor speed control circuit as in claim 1 wherein the first and second phases of the drive signal are different voltage potentials.

3. An electrical motor speed control circuit as in claim 2 wherein the second phase of the drive signal is substantially zero voltage potential.

4. An electrical motor speed control circuit as in claim 1 wherein the first phase of the drive signal is positive voltage potential and the second phase of the drive signal is negative voltage potential.

5. An electrical motor speed control circuit as in claim 1 wherein the on-state and off-state of the switching means are represented by signals having different voltage potentials.

6. An electrical motor speed control circuit as in claim 5 wherein the signal representing the on-state of the switching means is substantially zero voltage potential and the signal representing the off-state of the switching means is a positive voltage potential.

7. An electrical motor speed control circuit as in claim 1 for driving a bidirectional motor wherein:

the motor has first and second coasting directions and characteristic back emfs associated therewith;

the comparator includes means for producing the first output signal when the armature voltage is the back emf associated with the first and second coasting directions having a value less than the reference voltage, and for producing the second output signal when the armature voltage is greater than the reference voltage.

8. An electrical motor speed control circuit as in claim 7 wherein the first and second phases of the drive signal are different voltage potentials.

9. An electrical motor speed control circuit as in claim 8 wherein the second phase of the drive signal is substantially zero voltage potential.

10. An electrical motor speed control circuit as in claim 7 wherein the first phase of the drive signal is positive voltage potential and the second phase of the drive signal is negative voltage potential.

11. An electrical motor speed control circuit as in claim 7 wherein the on-state and off-state of the switching means are represented by signals having different voltage potentials.

12. An electrical motor speed control circuit as in claim 7 wherein the signal representing the on-state of the switching means is substantially zero voltage potential and the signal representing the off-state of the switching means is a positive voltage potential.

13. An electrical motor speed control circuit as in claim 1 further including a detector having an input port continuously connected to the motor and an output port connected to the first input port of the comparator for continuously producing an output signal in response to the armature voltage of the motor.

* * * * *